M. A. THOMAS AND B. M. BESKOW.
ELECTRIC TOASTER.
APPLICATION FILED JULY 11, 1919.
1,332,935.
Patented Mar. 9, 1920.
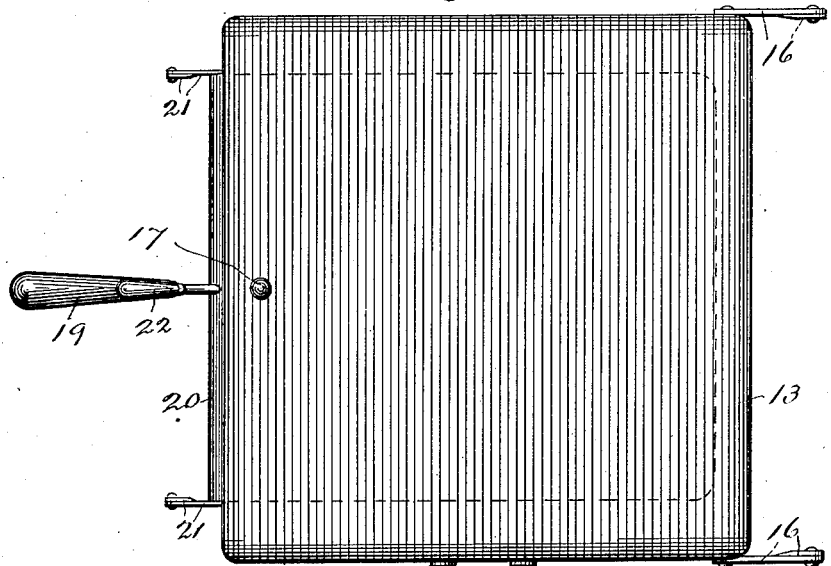
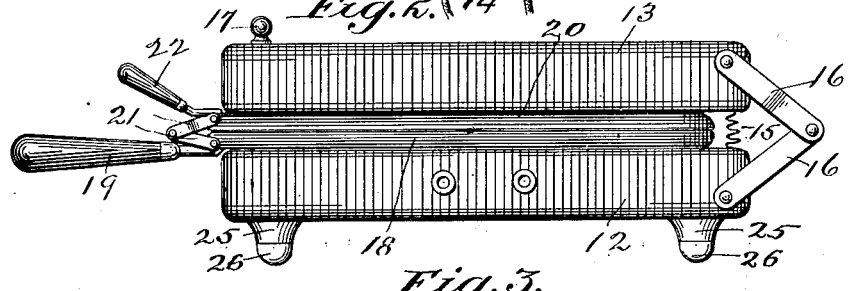
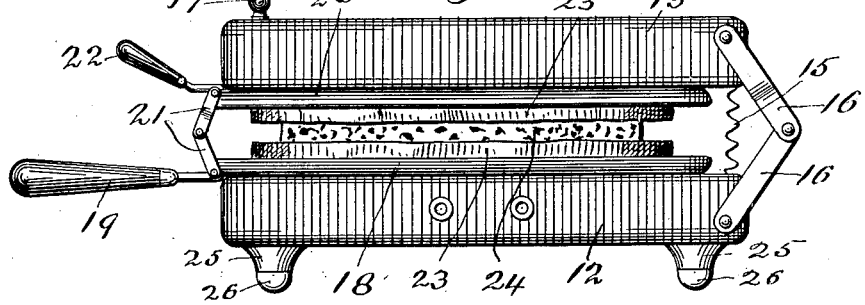
Inventors:
Mary A. Thomas
Bernhard M. Beskow
by Kahn Kahn
Att'ys.

UNITED STATES PATENT OFFICE.

MARY A. THOMAS, OF NEW YORK, AND BERNHARD M. BESKOW, OF LAKE GEORGE, NEW YORK.

ELECTRIC TOASTER.

1,332,935.     Specification of Letters Patent.     Patented Mar. 9, 1920.

Application filed July 11, 1919. Serial No. 310,126.

*To all whom it may concern:*

Be it known that we, MARY A. THOMAS and BERNHARD M. BESKOW, both citizens of the United States, residing, respectively, at New York, county of New York, and Lake George, in the county of Warren and State of New York, have invented or discovered certain new and useful Improvements in Electric Toasters, of which the following is a specification, reference being had therein to the accompanying drawing.

This invention has for its object to provide an electric toasting or broiling device comprising two members to be heated by an electric current and which members are loosely connected with each other so that the toasting or broiling parts may automatically adjust themselves so that they may be in contact with both sides of articles of different thicknesses. To this end the toasting or broiling members, heated by an electric current, are joined together by links which permit them to recede from or approach each other according to the thickness of the article to be toasted or broiled.

In the accompanying drawing Figure 1 is a plan view of an electric heater embodying the present invention. Fig. 2 is a side view of the same showing the toasting or broiling parts close together, and Fig. 3 is a view similar to Fig. 2 but showing the toasting or broiling parts separated from each other by a thick article to be toasted.

Referring to the drawing, 12 and 13 denote electric heating devices which may be internally of any well known or suitable construction, and which are supplied with electric current through conductors 14 connected to the lower member 12, the current being carried to and from the upper member 13 by suitable connections, as 15, joining the two members. The members 12 and 13 have loose hinged connections with each other by means of links 16, and the upper member 13 is preferably provided with a knob 17 by which it may be lifted for the purpose of removing or inserting the articles to be toasted or broiled. Resting on the member 12 is a metal pan 18 preferably provided with a handle 19 by which it may be carried, and connected with said pan 18 is a similar pan 20 which is inverted and on which rests the upper heating member 13. The pans 18 and 20 are connected together by links 21 at the side of the toaster opposite the links 16, and the pan 20 is preferably provided with a handle 22 which may be pressed upon to lift the said pan 20 when an article to be toasted or broiled is to be inserted between the two pans.

The links 16 joining the heating members 12 and 13, as also the links 21 joining the toasting or broiling members 18 and 20, afford flexible connections between these members so that they may remain parallel to each other as they automatically adjust themselves to articles of different thickness placed between them.

From the foregoing it will be understood that the toasting or broiling pans 18 and 20, electrically heated from the members 12 and 13, are adapted to be in contact with both sides of articles of different thicknesses to be toasted or broiled, in that the toasting members are so connected and arranged that they may be close together, as in Fig. 2, or may be considerably separated as shown in Fig. 3. In Fig. 3 the lower of two slices 23 of bread rests in the lower toasting pan 18, while the upper toasting pan 20, on which the heating member 13 rests, is in contact with the upper slice of bread, these slices of bread being supposedly separated by a slice of cheese 24, so that a toasted cheese sandwich, which may be of any desired thickness, may thus be quickly and readily made.

The lower heating member 12 is preferably provided with short legs 25 which may be furnished with porcelain feet or knobs 26.

Having thus described our invention we claim and desire to secure by Letters Patent:

1. An electric toasting or broiling device comprising toasting or broiling members having loose flexible connections with each other so that they may move toward and from each other while remaining parallel, and may thus automatically adjust themselves to articles of different thicknesses placed between them to be toasted or broiled.

2. An electric toasting or broiling device comprising two electrically heated members loosely connected with each other, in combination with two toasting or broiling members which are also loosely connected with each other and which are heated from said heating members.

3. An electric toasting or broiling device comprising two electrically heated members loosely connected with each other, in combination with two toasting or broiling members which are also loosely connected with each other and which are heated from said heating members, the loose connections of said toasting or broiling members being on the opposite side of the device from the loose connections of said heating members.

4. An electric heating or broiling device comprising two electrically heated members connected with each other at one side by links affording loose hinged connections, in combination with two toasting or broiling members which are also connected with each other at one side by links also affording loose hinged connections, and which toasting or broiling members are heated from said heating members.

5. An electric heating or broiling device comprising two electrically heated members connected with each other at one side by links affording loose hinged connections, in combination with two toasting or broiling members which are also connected with each other at one side by links also affording loose hinged connections, and which toasting or broiling members are heated from said heating members, the loose connections of said toasting or broiling members being on the opposite side of the device from the loose connections of said heating members.

In testimony whereof we affix our signatures.

MARY A. THOMAS.
BERNHARD M. BESKOW.

Witness:
   FLORENCE E. THOMAS.